United States Patent [19]
White et al.

[11] 3,842,730
[45] Oct. 22, 1974

[54] MACHINE FOR LOADING, STACKING AND UNLOADING CROPS

[75] Inventors: Allen A. White, Peabody; Harold Keith Garrison, Newton; Dean P. Brooks, Hesston, all of Kans.

[73] Assignee: Hesston Corporation, Hesston, Kans.

[22] Filed: June 9, 1972

[21] Appl. No.: 261,346

Related U.S. Application Data

[62] Division of Ser. No. 139,391, May 3, 1971, Pat. No. 3,691,741.

[52] U.S. Cl. ............... 100/245, 100/215, 100/218, 100/255, 100/271, 100/293, 100/295, 100/100
[51] Int. Cl. ....................... B30b 1/32, B30b 15/06
[58] Field of Search ........... 100/240, 245, 270, 271, 100/293, 295, 90, 91, 233, 215, 218, 255, 100; 214/9

[56] References Cited
UNITED STATES PATENTS

| | | | |
|---|---|---|---|
| 19,571 | 3/1858 | Loving | 100/293 |
| 52,911 | 2/1866 | Thatford | 100/293 |
| 129,119 | 7/1872 | Fanghaenel | 100/245 |
| 1,186,735 | 6/1916 | Bino | 100/245 |
| 1,981,198 | 11/1934 | Rupp | 100/293 |
| 3,412,532 | 11/1968 | Nickla | 100/233 |
| 3,605,608 | 9/1971 | Dagley | 100/271 |

*Primary Examiner*—Billy J. Wilhite
*Attorney, Agent, or Firm*—Schmidt, Johnson, Hovey & Williams

[57] ABSTRACT

A harvesting vehicle picks up the crop from the field, feeds it into a container, presses the crop into a compact stack and unloads the stack at a desired point of discharge. The press is reciprocated vertically with the container through use of a U-shaped lift swingable on the container and having arms that are operably coupled with the press. A normally locked endgate is controlled by the press such as to unlock the endgate and raise it to an open position for unloading in response to raising of the press. The container is tiltable for unloading purposes through use of an actuator common to the press such as to effect tilting after the endgate is opened and after the press is raised.

11 Claims, 20 Drawing Figures

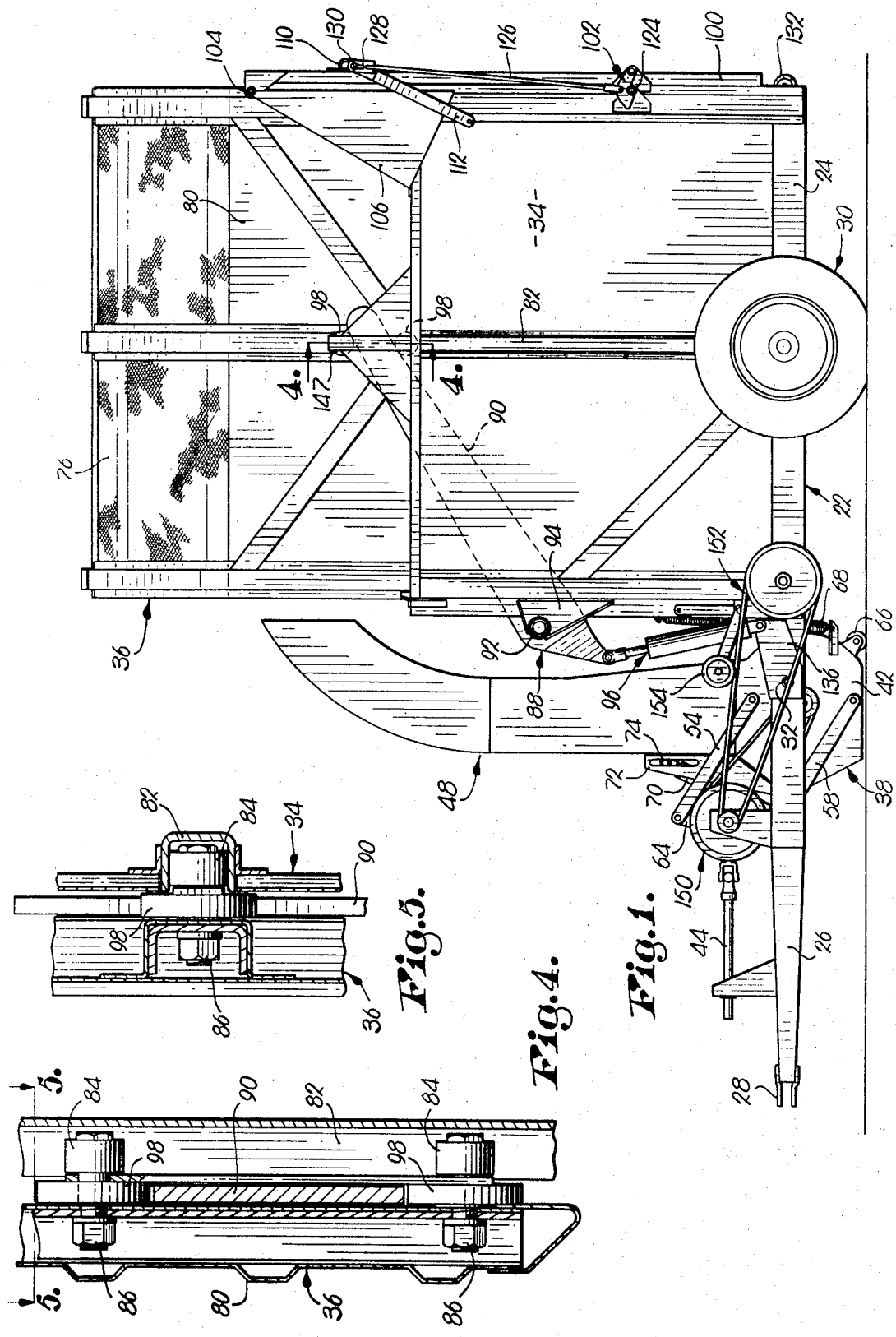

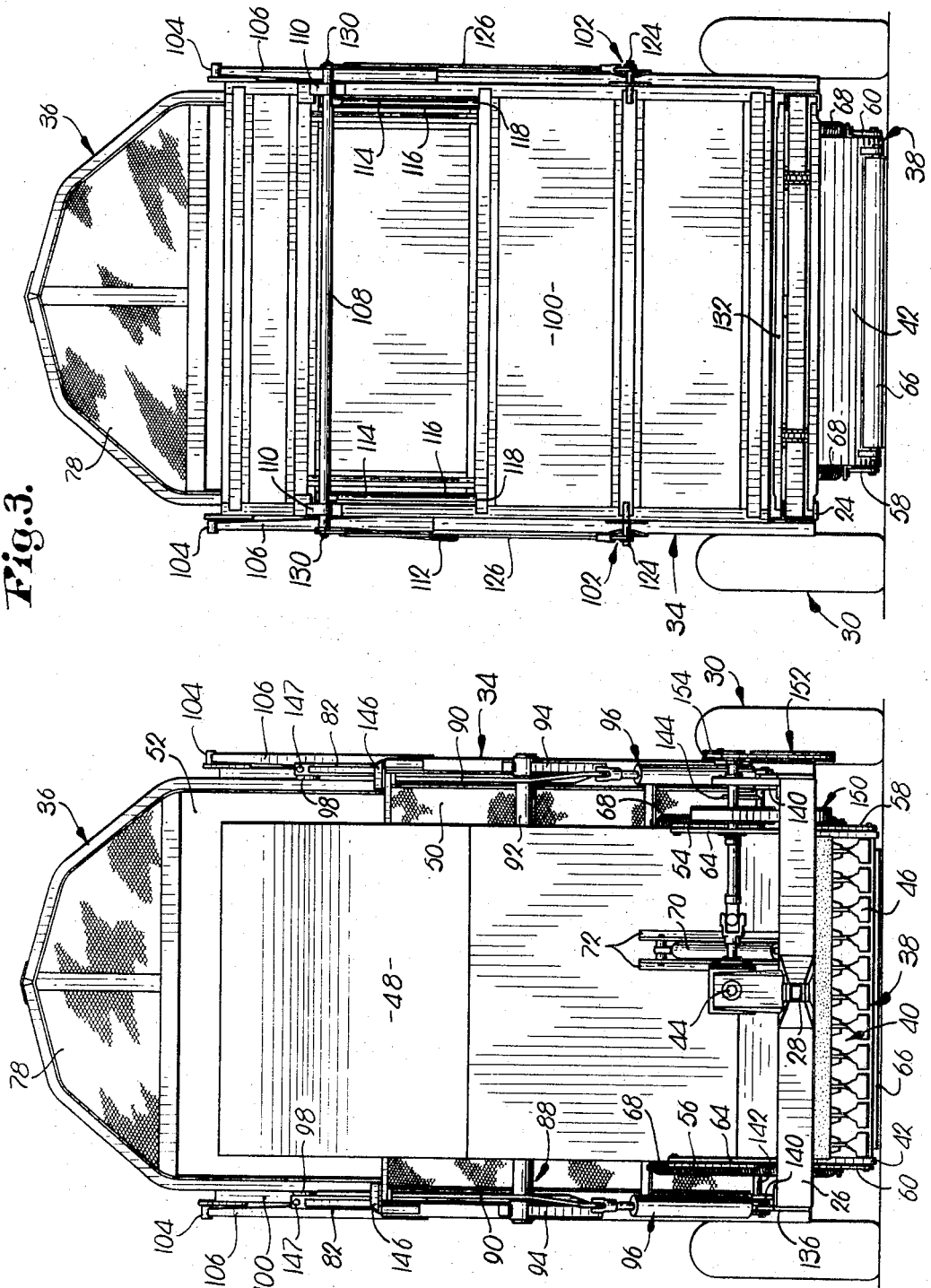

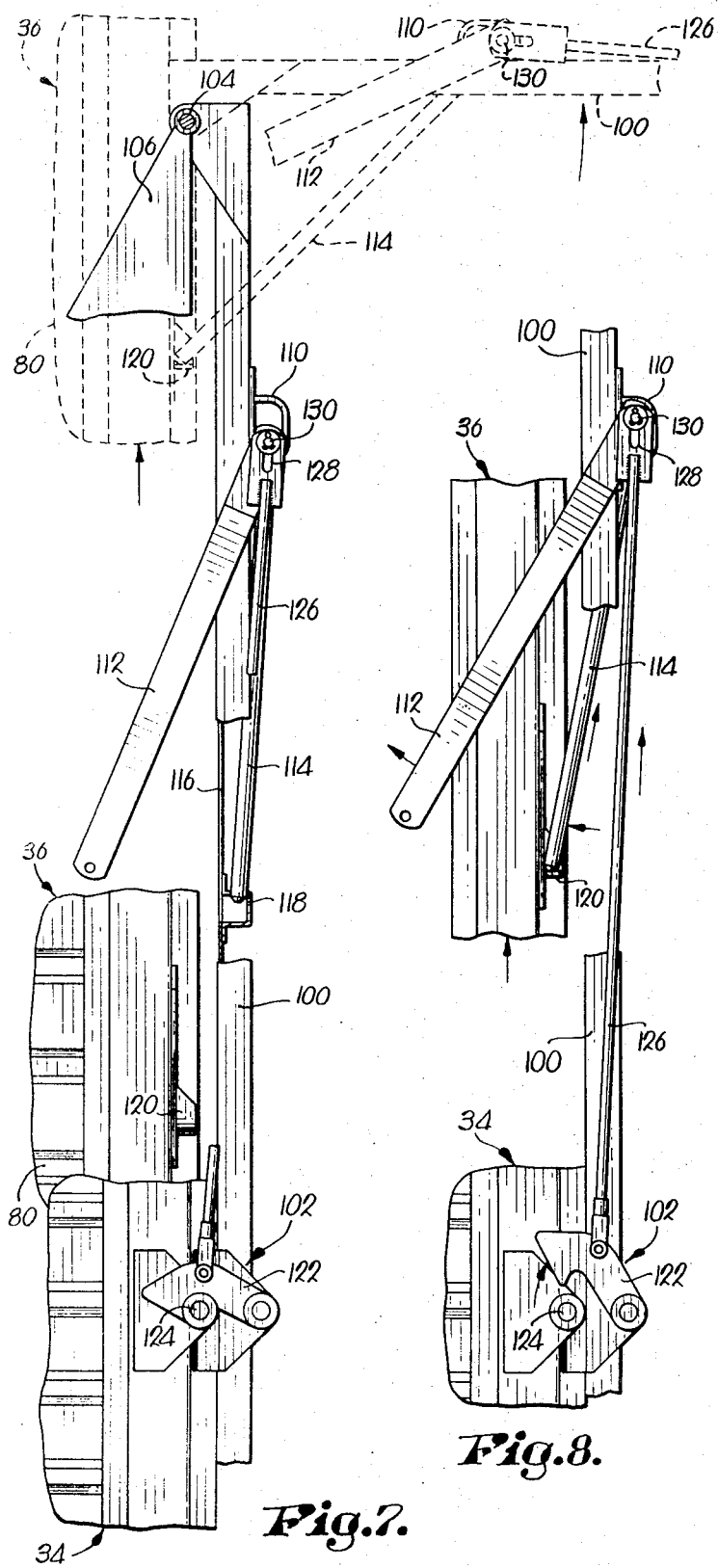
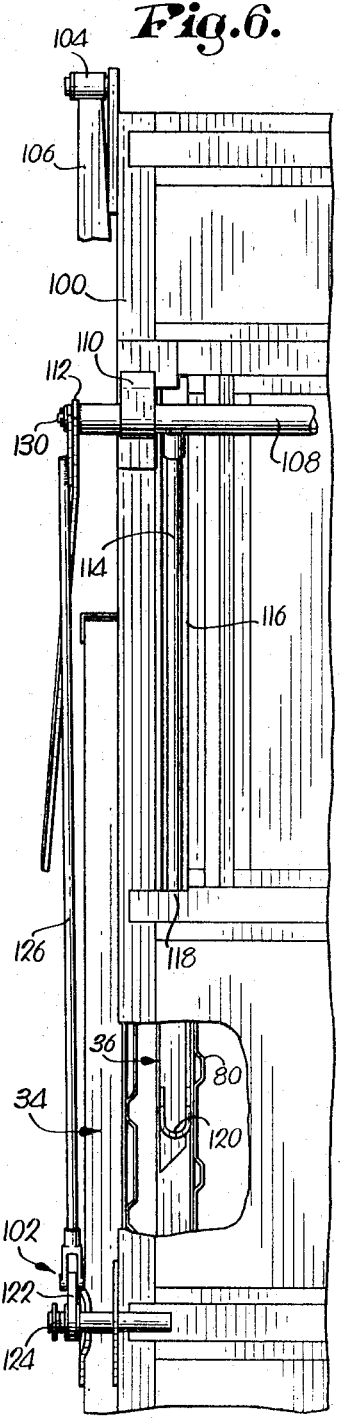

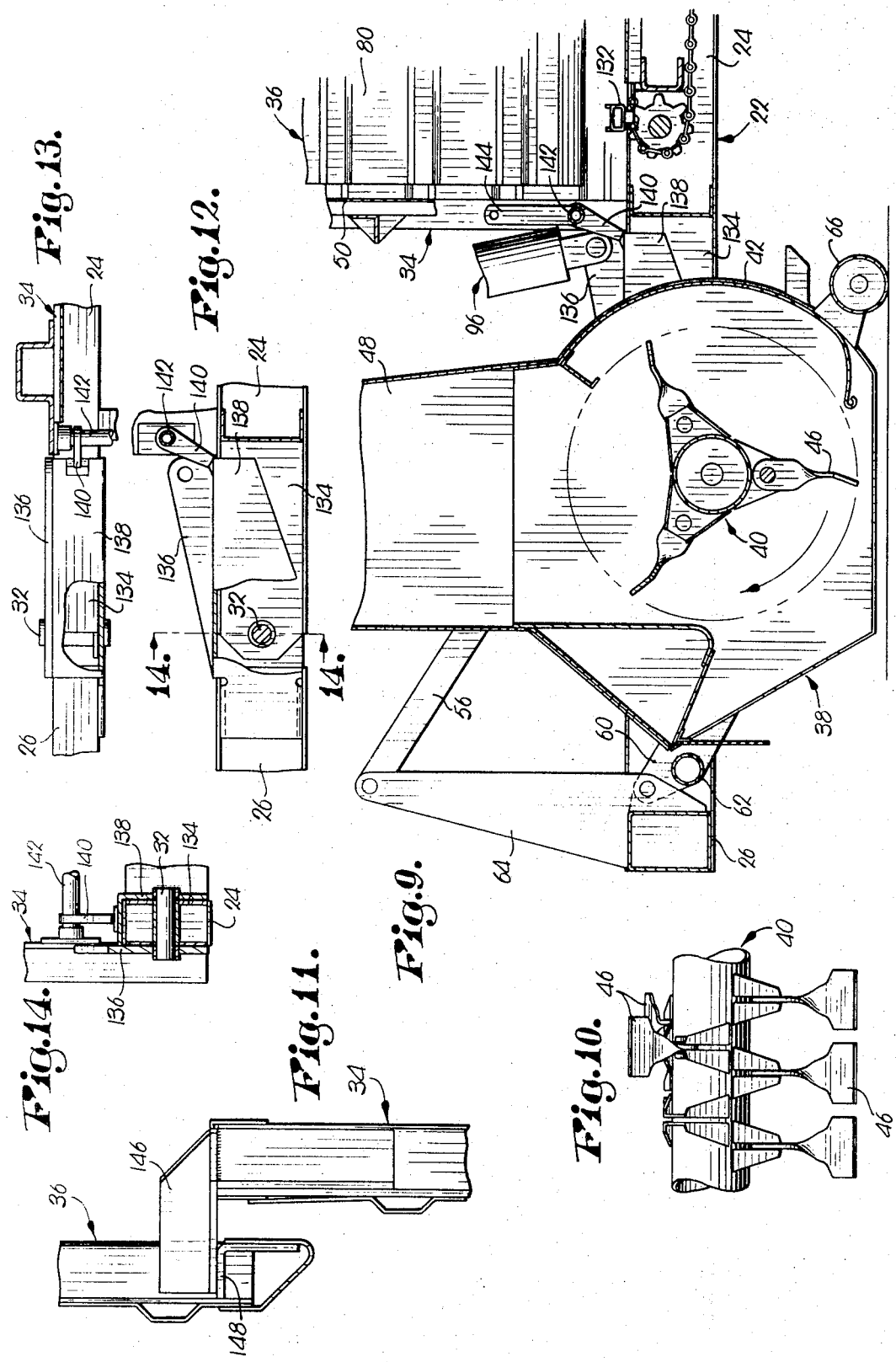

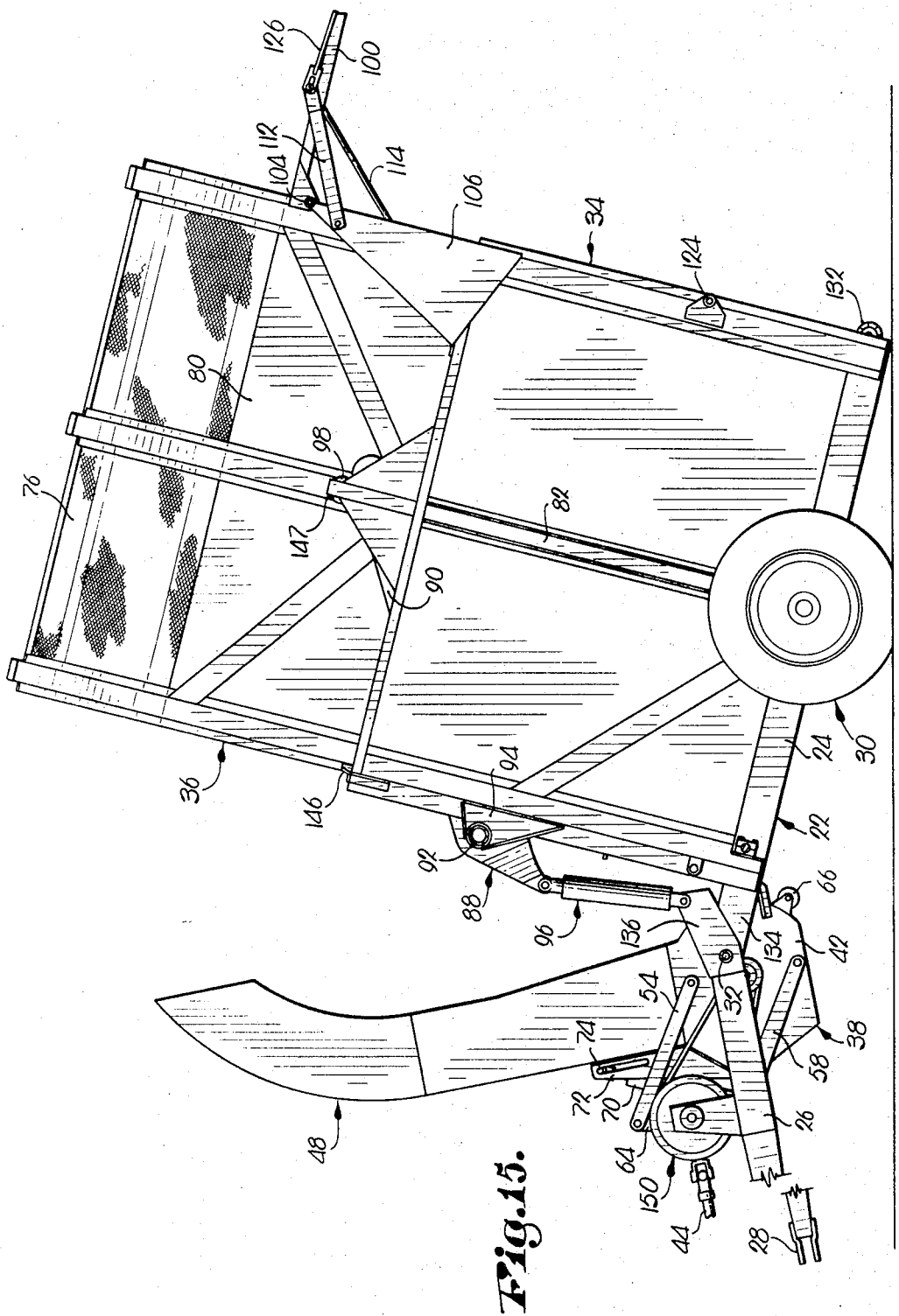

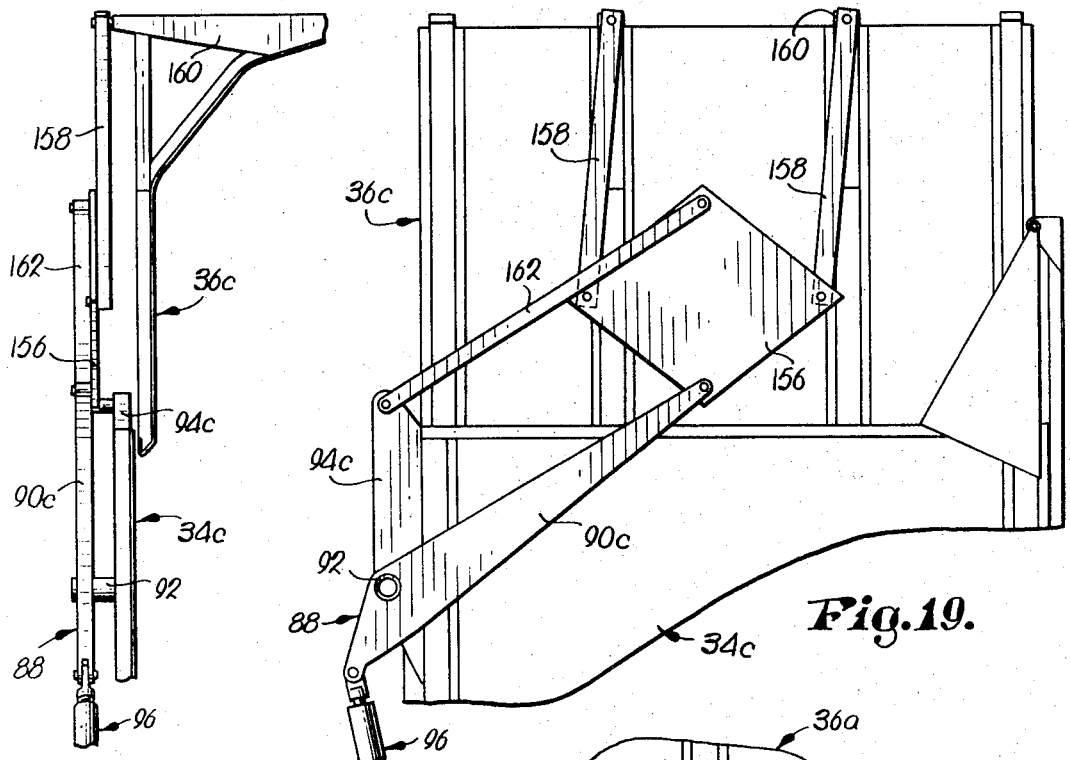
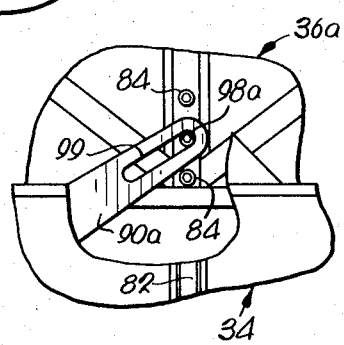
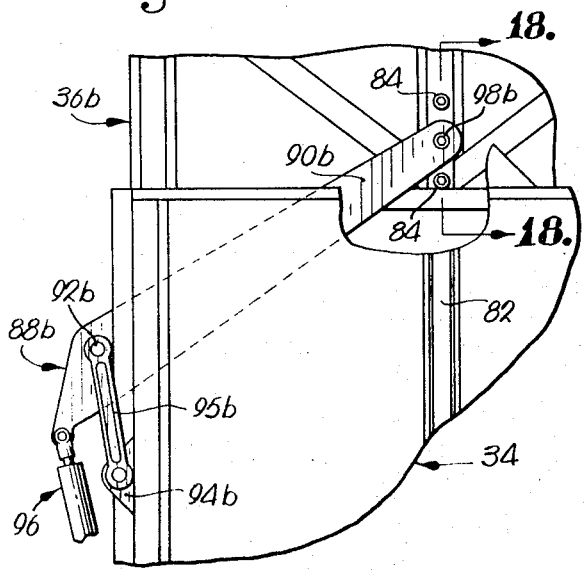
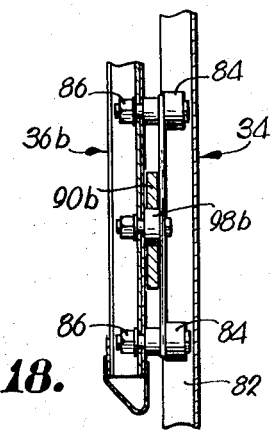

MACHINE FOR LOADING, STACKING AND UNLOADING CROPS

This is a devisional application of application Ser. No. 139,391 filed May 3, 1971 and now U.S. Pat. No. 3,691,741 which issued Sept. 19, 1972.

An important object of our present invention is to provide a stacker to be used in the field for producing a stack as the crop is picked up wherein a press for compacting the crop in a container is controlled by a lift capable of transmitting the necessary forces to the press without need for complicated and expensive power actuators.

Another important object of the instant invention is the provision of a stacker of the aforementioned character wherein rapid unloading of the stack is facilitated by use of an endgate for the container which is not only unlocked but raised to an open position by the press through the simple expedient of raising the press.

Still another important object of our instant invention is to provide a stacker as above set forth in which tilting of the container for unloading purposes is effected by use of the same power as is employed for controlling the press so that the steps of raising the press, opening the endgate and tilting the container take place in rapid succession without need for laborious and time-consuming operator function, all through use of the simplest of mechanisms, reduced manufacturing costs and substantially trouble-free components.

In the drawings:

FIG. 1 is a side elevational view of a machine for loading, stacking, and unloading crops made in accordance with our present invention;

FIG. 2 is a front elevational view thereof;

FIG. 3 is a rear elevational view thereof;

FIG. 4 is an enlarged, fragmentary, cross-sectional view taken on line 4—4 of FIG. 1;

FIG. 5 is a cross-sectional view taken on line 5—5 of FIG. 4;

FIG. 6 is an enlarged, fragmentary, rear elevational view similar to FIG. 3 showing however, only a small portion of the press, parts being broken away for clearness;

FIG. 7 is an enlarged, fragmentary, side elevational view similar to FIG. 1, parts being broken away and in section to reveal details of construction, the press and the endgate being shown in their raised positions by dotted lines;

FIG. 8 is a fragmentary view similar to FIG. 7 but illustrating the position of certain components at the time of initial unlocking of the endgate;

FIG. 9 is an enlarged, fragmentary, vertical cross-sectional view through the pickup and portions of the container components;

FIG. 10 is a fragmentary detailed view in elevation showing a portion of the rotor of the pickup;

FIG. 11 is an enlarged, fragmentary, front elevational view similar to FIG. 2 with the front wall of the container entirely removed, illustrating the stop for limiting the extent of upward movement of the front end of the press;

FIG. 12 is an enlarged, fragmentary, side elevational view similar to FIG. 1 showing the toggle joint between the chassis sections, parts being broken away and in section for clearness;

FIG. 13 is an essentially top plan view of the structure shown in FIG. 12;

FIG. 14 is a fragmentary, detailed, cross-sectional view taken on line 14—14 of FIG. 12;

FIG. 15 is a view similar to FIG. 1 but illustrating the machine in its stack unloading position;

FIG. 16 is a fragmentary, detailed, side elevational view similar to FIG. 1, parts being broken away to illustrate a modified coupling between the press and its lift;

FIG. 17 is a side elevational view similar to FIG. 1 illustrating still another modification of the lift and its connections to the container and the press;

FIG. 18 is a fragmentary, detailed, cross-sectional view taken on line 18—18 of FIG. 17;

FIG. 19 is a fragmentary side elevational view similar to FIG. 1 illustrating still another modification of the structure for raising and lowering the press; and FIG. 20 is a fragmentary view looking forwardly of the machine and illustrating one of the two assemblies of the lift shown in FIG. 19.

Referring first to the embodiment of our invention illustrated in FIGS. 1-15, and initially to FIGS. 1-3 and 15, the machine or implement chosen for illustration is designed to be towed by a tractor, and to this end there is provided a chassis broadly designated by the numeral 22 which includes a rear section 24 and a front section 26, the latter of which is provided with a suitable hitch 28. The section 24, on the other hand, is supported by a wheel and axle assembly 30. As is evident in FIG. 15, the sections 24 and 26 are connected in toggle joint fashion for swinging movement about a pair of spaced horizontal trunnions 32, one only of which is illustrated in FIGS. 1 and 12-15.

The crop to be formed into a stack within a container 34 on chassis section 24 by use of a press 36 is raised out of the field, and usually from a window, through use of a pickup broadly designated by the numeral 38 and carried by the chassis section 26. Pickup 38 includes a rotor 40 within a housing 42 and rotated in the direction of the arrow of FIG. 9 from a suitable prime mover as, for example, the power takeoff of the towing tractor that is operably coupled with the rotor 40 from a driven shaft 44 (see FIGS. 1, 2 and 15).

The housing 42 is open at its front and bottom throughout the length of the housing 42, transversely of the direction of travel of the vehicle for reception of the crop as it is picked up off the ground by a plurality of swinging hammers 46 forming a part of the rotor 40. The rotor 40 also operates to generate artificial currents of air which direct the crop upwardly through a chute 48 carried by the housing 42 and terminating in an upper outlet end that is directed rearwardly for propelling the crop into the container 34 above the upper end of the front wall 50 of container 34 and through opening 52 at the front end of the press 36.

The housing 42 and therefore the rotor 40 and the spout 48 are mounted on the chassis section 26 by means of parallel linkage which includes a pair of upper links 54 and 56 and a pair of lower links 58 and 60 as best shown in FIGS. 1, 9 and 15, the lower links 58 and 60 being interconnected by a cross element 62, and the forward ends of all four links 54, 56, 58 and 60 being pivotally connected with upstanding frame elements 64 rigid to the chassis section 26.

The pickup 38 normally rides lightly on the ground for up and down movement over uneven terrain by virtue of the provision of ground engaging roller means 66 on the housing 42 and the use of a pair of flotation springs 68 interconnecting the housing 42 and the container 34. The housing 42 may be raised to an over-the-road position by virtue of the provision of a fluid pressure piston and cylinder assembly 70 interconnecting spout 48 through bracket means 72 rigid to the housing 42 and to the spout 48. A pin and slot arrangement 74 between the bracket 72 and the assembly 70 permits free vertical movement of the housing 42 over uneven terrain as aforesaid.

The press 36 is essentially U-shaped in transverse cross section presenting a generally arcuate rod 76 extending fore and aft of the container 34. Roof 76, together with its gable ends 78 and the front wall 50 of the container 34 are preferably foraminous, whereas imperforate sidewalls are provided for the press 36, one of which is illustrated in FIGS. 1 and 15 and designated by the numeral 80.

The sides of the container 34 are reinforced by a number of vertical members, one of which is best illustrated in FIGS. 1, 4, 5 and 15, intermediate the fore-and-aft ends of the container 34 and designated by the numeral 82. These two opposed intermediate members 82 are transversely U-shaped, serving therefore as guide tracks for vertical reciprocation of the press 36, receiving two or more rollers 84 carried by the press 36 through use of suitable fasteners 86. Additionally, when at least two or more rollers 84 are paired in guide tracks 82 as illustrated in FIGS. 4 and 16–18, the press 36 is held against tilting fore and aft as it is vertically reciprocated.

A U-shaped lift 88 having a pair of arms 96 embracing the press 36 is mounted on the container 34 through use of a transverse horizontal torsion bar 92 rigid to the arms 90 and extending across the front wall 50 of the container 34 exteriorly of the latter. The bar or rod 92 is carried by the container 34 for rotation about its horizontal longitudinal axis through use of forwardly extending brackets 94.

Fluid pressure piston and cylinder units 96 pivotally interconnecting the chassis section 26 with the forwardmost and lower-most ends of the arms 90 operate to swing the lift 88 about the axis of the bar 92 to in turn raise and lower the press 36. To this end the arms 90 are interposed between the sides 80 of the press 36 and the sidewalls of the container 34, there being suitable clearance slots provided in the front wall 50 of container 34 to accommodate the arms 90 for vertical swinging movement. The arms 90 extend between a pair of rotatable discs 98 carried by the fasteners 86 as is clear in FIGS. 1, 4 and 5, it being noted in FIGS. 1 and 15 that the tracks 82 extend upwardly a short distance beyond the upper edges of the sidewalls of the container 34.

An endgate broadly designated by the numeral 100 normally closes the rear end of the container 34 and is held in such closed position by a pair of locks 102 (see also FIGS. 6–8). Endgate 100 is swingable from the normally closed vertical position shown in FIGS. 1, 3, 6–8 to the open horizontal position shown by dotted lines in FIG. 7 by the provision of pintles 104 carried by brackets 106 rigid to the container 34 at its uppermost and rearmost corners. A shaft 108 extending across the endgage 100 within loops 110 rigid to the endgate 100 has an elongated bar 112 rigid thereto at one end of the shaft 108 and extending radially from the shaft 108 downwardly and forwardly along one sidewall of the container 34. The bar 112 is adapted to receive a rope or the like extending forwardly to the operator of the towing vehicle permitting control, that is, rotation of the shaft 108 within the loops 110 by the operator.

A pair of rods 114 rigid to the shaft 108 and depending therefrom inwardly of the loops 110 are cleared by slots 116 in the endgate 100 and terminate within stop pockets 118 within which such lower ends of the rods 114 are normally disposed as shown in FIG. 7. On the other hand, when the bar 112 is pulled forwardly in the direction of the arrow shown in FIG. 8 to thereby rotate the shaft 108, the rods 114 are likewise swung forwardly out of the pockets 118 into the path of travel of abutments 120 rigid to the rearmost end of press 36 as shown in FIG. 8.

The locks 102 include swingable latches 122 carried by the endgate 100 and normally hooked over outwardly extending pins 124 rigid to the container 34. The latches 122 are pivotally connected with the shaft 108 by links 126 having slots 128 at their upper ends receiving reduced ends 130 of shaft 108.

Unloading of the stack formed in the container 34 through use of the press 36, as will hereinafter be more fully explained, takes place with the press 36 raised and with the endgate 100 open, such unloading being accomplished through use of a suitable, slatted chain-type conveyor 132 located in the bottom of the container 34 or more particularly within the chassis section 24 as illustrated in FIG. 9. It is contemplated, depending upon th overall size of the container 34, and therefore the stack, and depending upon the height of the chassis section 24 off the ground, that the stack merely be fed out of the open rear end of the container 34 for slight drop to the ground.

However, in tthe event that it is desired to tilt the container 34 in ramp-like fashion as illustrated in FIG. 15, the units 96, used primarily as actuators for the press 36, may be employed, after the press 36 is raised, to tilt the container 34 by breaking the joint between the sections 24 and 26 about the trunnions 32. The operable connection between the units 96 and the chassis section 26 is best illustrated in FIGS. 12–15 wherein, by way of example, the chassis section 24 have tongues 134 which receive the trunnions 32, and wherein the units 96 are pivotally connected with upstanding plates 136 rigid to the chassis section 26. Plates 136 form a part of a U-shaped cap 138 which embraces the chassis section 24 and is welded or otherwise permanently attached at its forward end to the chassis section 26.

A pin 147 as shown in FIG. 1 is provided at the uppermost end of each of members 82 on container 34 for engagement by the topmost roller 84 thus limiting the upward movement of press 36.

Triggers 140 rigid to a shaft 142 rotatably carried by the container 34 normally overlie the caps 138 to prevent tilting of the container 34, such triggers 140 being releasable through the provision of an upstanding crank 144 rigid to the shaft 142 and adapted to receive a rope or the like leading to a point of accessibility to the operator of the towing vehicle.

At least one stop 146 at a forwardmost top corner of the container 34 is provided to limit the extent of tilting movement of the press 36 when endgate 100 is in its raised position thereby causing a weight imbalance. Element 148 on the press 36 engages stop 146 as shown in FIGS. 1, 2, 11 and 15.

OPERATION

During the stack forming operation while the machine is advanced through the field the chassis sections 24 and 26 are horizontally disposed as shown in FIG. 1; the gate 100 is closed as shown in FIGS. 1 and 3; and the press 36 is initially in its raised position against the stop 146 as shown in FIGS. 1–3.

The rotor 40, powered from the shaft 44 through belt and pulley means 150, is rotated continuously in the direction of the arrow shown in FIG. 9 to raise the crop off the ground. At this time, the power assembly 70 is released such that the pickup 38 rides along the terrain through use of roller 66, somewhat floatingly because of the springs 68, with full capability to rise and fall because of the slot 74 and the operation of the four point linkage 54–60.

The crop is elevated in the chute 48 partially by propulsion and partially by the force of air created by the rotor 40. The crop discharges from the upper rearwardly facing open end of the chute 48 directly into the container 34 through the opening 52, and such operation may continue until the level of the crop in the container 34 reaches approximately the height of the lower edge of the outlet of chute 48.

Manifestly, the air currents are discharged through the foraminous top 76 and gables 78 of the press 36 as the crop gravitates into the container 34.

At this time the assemblies 96 are actuated to swing the lift 88 about the axis of the torsion bar 92, swinging the arms 90 downwardly as the discs 98 rotate freely along the upper and lower longitudinal edges of the arms 90. This lowers the press 36 into the container 34, causing the press 36 to increase the density of the crop in the container 34 into a relatively compact mass.

The press 36 is then raised to again clear the opening 52 for receipt of additional material. Such intermittent pressing of the crop in the container 34 may continue as often as is necessary until a fully formed compact stack is formed in the container 34 conforming in configuration to the shape of the container 34 and the shape of the press 36, particularly the top 76 of the latter.

The finished stack may be transported to any desired point of unloading, the first step of which comprises opening of the endgate 100. With the press 36 lowered sufficiently to place the abutments 120 below the lower ends of the rods 114, as illustrated in FIG. 7, the operator pulls on the bar 112 to swing the rods 114 out of the pockets 118 and into the path of upward movement of the abutments 120 as the press 36 is raised.

During the initial upward movement of press 36, while the bar 112 is held in its forward position, the abutments 120 come into contact with the lower ends of the rods 114, pushing the shaft 108 to the upper ends of the loops 110. The upward movement of the shaft 108 within loops 110 provides a lost motion action to effect a pull on thhe links 126 to swing the latches 122 upwardly from the position shown in FIG. 7 to the position illustrated in FIG. 8, thereby releasing the latches 122 from the pins 124, permitting gate 100 to swing to its open position.

Further upward movement of the press 36 with rods 114 still engaging abutments 120 causes shaft 108 to push against the upper ends of loops 110 thereby raising the endgate 100 about the pintles 104 to the dotted line position illustrated in FIG. 7, with the rods 114 extending obliquely from the abutments 120 to the shaft 108.

At this time the unloader chain conveyor 132 is placed in operation by tightening the belt of a belt and pulley assembly 152 through use of a belt tightener 154.

If, however, it is desired prior to such unloading to tilt the container 34 as illustrated in FIG. 15, it is but necessary to release the triggers 140 as previously described and continue the actuation of the assemblies 96. Inasmuch as the press 36 has reached its upper limit against pins 147, further retraction of the pistons of the assemblies 96 will exert a pull on the plates 136, causing the chassis sections 24 and 26 to bend or toggle about the trunnions 32 as is clear in FIG. 15. Then, manifestly, the operation of the conveyor 132 is to cause the stack to move rearwardly on an incline and deposit the stack on the ground as the vehicle is moved forwardly through use of the towing vehicle.

After unloading, the press 36 is lowered to return the gate 100 to its closed position and, in this connection, it will be noted that the latches 122 move into engagement with the pins 124 and automatically snap thereover by virtue of the slots 128 at the upper ends of the links 126.

OTHER EMBODIMENTS

In FIG. 16 of the drawings there is illustrated a modified coupling between arms 90a and press 36a which may be used in lieu of the discs 98 which includes a single roller 98a carried by the press 36a and riding within slot 99 in the arm 90a.

In FIGS. 17 and 18 arms 90b are connected directly with the press 36b by a pivot pin 98b. Moreover, torsion member 92b which rigidly interconnects the arms 90b of lift 88b is supported by brackets 94b, by rockers 95b swingably connected to the brackets 94b and to the cross member 92b.

In FIGS. 19 and 20 arms 90c are pivotally connected to plates 156 that are in turn pivotally connected with a pair of hangers 158 having their upper ends pivotally connected with lateral projections 160 rigid to the roof of press 36c. A link 162 pivotally interconnecting plate 156 and bracket 94c forms a parallel linkage arrangement with the arm 90c for holding the press 36c against tilting during reciprocation and, in this connection, any suitable guide structure (not shown) may be provided to restrain the press 36c against fore and aft movement relative to container 34c.

In all respects, the operation as above set forth with respect to FIGS. 1–15 applies equally to the modifications of FIGS. 16–20.

Having thus described the invention, what is claimed as new and desired to be secured by letters patent is:

1. A stacker including:
   a container adapted to receive a crop to be stacked;
   a vertically reciprocable press carried by the container for forming the crop in the container in a compact stack;
   a U-shaped lift having a pair of arms embracing the press and mounted on the container for swinging movement about a horizontal axis; and
   means for each arm respectively coupling the same with the press for reciprocating the latter in response to swinging of said lift, said coupling means each including a pair of rollers on the press remote from said axis and having the corresponding arm disposed therebetween.

2. A stacker as claimed in claim 1 wherein each arm has a fluid pressure piston and cylinder unit operably coupled therewith at one end thereof for swinging said lift, said rollers being at the opposite ends of the arms.

3. A stacker as claimed in claim 2 wherein said lift includes an elongated torsion member carried by th container across one end of the latter, rigidly interconnecting the arms, and rotatable about said axis, the arms embracing the container.

4. A stacker including:
a container adapted to receive a crop to be stacked;

a vertically reciprocable press carried by the container for forming the crop in the container into a compact stack;
a U-shaped lift having a pair of arms embracing the press and mounted on the container for swinging movement about a horizontal axis; and
means for each arm respectively coupling the same with the press for reciprocating the latter in response to swinging of said lift,
said coupling means each including a roller on the press remote from said axis, each arm having an elongated, roller-receiving slot.

5. A stacker including:
a container adapted to receive a crop to be stacked;

a vertically reciprocable press carried by the container for forming the crop in the container into a compact stack;
a U-shaped lift having a pair of arms embracing the press and mounted on the container for swinging movement about a horizontal axis; and
means for each arm respectively coupling the same with the press for reciprocating the latter in response to swinging of said lift;
the mounting of the lift on the container including a rocker for each arm respectively pivotally interconnecting the arms and the container, said coupling comprising a pivot on each arm respectively remote from the rockers.

6. A stacker including:
a container adapted to receive a crop to be stacked;

a vertically reciprocable press carried by the container for forming the crop in the container into a compact stack;
a U-shaped lift having a pair of arms embracing the press and mounted on the container for swinging movement about a horizontal axis; and
means for each arm respectively coupling the same with the press for reciprocating the latter in response to swinging of said lift,
said coupling means each including a pair of pivotally interconnected hangers swingably coupled with the press and pivotally attached to the corresponding arm.

7. A stacker including:
a container adapted to receive a crop to be stacked;

a vertically reciprocable press carried by the container for forming the crop in the container into a compact stack;
a U-shaped lift having a pair of arms embracing the press and mounted on the container for swinging movement about a horizontal axis;
means for each arm respectively coupling the same with the press for reciprocating the latter in response to swinging of said lift; and
means operably interconnecting the press and the container for holding the press against tilting during reciprocation.

8. A stacker including:
a container adapted to receive a crop to be stacked;

a vertically reciprocable press carried by the container for forming the crop in the container into a compact stack;
a U-shaped lift having a pair of arms embracing the press and mounted on the container for swinging movement about a horizontal axis; and
means for each arm respectively coupling the same with the press for reciprocating the latter in response to swinging of said lift,
said lift including an elongated torsion member rigidly interconnecting the arms and mounted on said container for rotation about said axis.

9. A stacker is claimed in claim 8 wherein said member is carried by the container across one end of the latter and said arms embrace the container.

10. A stacker as claimed in claim 8 wherein is provided a fluid pressure piston and cylinder unit operably coupled with said lift for swinging the same about said axis.

11. A stacker as claimed in claim 8, each arm having an elongated uppermost surface, said coupling means each including a member on the press remote from said axis and movable along said surface of the corresponding arm during raising of the press by the lift.

* * * * *